US012177725B2

(12) United States Patent
Orcutt

(10) Patent No.: US 12,177,725 B2
(45) Date of Patent: Dec. 24, 2024

(54) ENABLING PERMISSIONLESS CELLULAR ROAMING CONNECTIONS BETWEEN USER EQUIPMENT AND RADIO ACCESS NETWORKS

(71) Applicant: DISH WIRELESS L.L.C., Englewood, CO (US)

(72) Inventor: Jennings Orcutt, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 338 days.

(21) Appl. No.: 17/710,343

(22) Filed: Mar. 31, 2022

(65) Prior Publication Data

US 2023/0319644 A1 Oct. 5, 2023

(51) Int. Cl.
| | |
|---|---|
| H04W 28/24 | (2009.01) |
| H04W 8/06 | (2009.01) |
| H04W 8/20 | (2009.01) |
| H04W 76/10 | (2018.01) |

(52) U.S. Cl.
CPC ............ *H04W 28/24* (2013.01); *H04W 8/06* (2013.01); *H04W 8/20* (2013.01); *H04W 76/10* (2018.02)

(58) Field of Classification Search
CPC ....... H04W 28/24; H04W 8/20; H04W 76/10; H04L 9/3247; H04L 9/50
See application file for complete search history.

(56) References Cited

U.S. PATENT DOCUMENTS

| | | | |
|---|---|---|---|
| 10,349,240 B2 * | 7/2019 | Senarath ................. | H04W 4/24 |
| 2021/0037013 A1 | 2/2021 | Salkintzis | |
| 2021/0243612 A1 | 8/2021 | Kempf et al. | |
| 2021/0360471 A1 * | 11/2021 | De Kievit ............. | H04L 1/0023 |
| 2022/0377597 A1 * | 11/2022 | Kotaru ................. | H04W 72/04 |
| 2023/0199552 A1 * | 6/2023 | Bahl ................... | H04L 41/5022 398/79 |
| 2023/0309100 A1 * | 9/2023 | Baek ..................... | H04W 72/20 |
| 2024/0080791 A1 * | 3/2024 | Aghili ................ | H04W 60/005 |

FOREIGN PATENT DOCUMENTS

| | | | |
|---|---|---|---|
| EP | 836 525 A1 | 6/2021 | |
| WO | WO-2021115688 A1 * | 6/2021 | ......... H04L 12/1446 |

OTHER PUBLICATIONS

International Search Report and Written Opinion for PCT/US2023/014268, dated Jun. 6, 2023, 13 pages.
Refaey et al., "A Blockchain Policy and Charging Control Framework for Roaming in Cellular Networks," arXiv:1906.06350v1, Jun. 14, 2019, 7 pages.

* cited by examiner

Primary Examiner — Deepa Belur
(74) Attorney, Agent, or Firm — Seed IP Law Group LLP

(57) ABSTRACT

A radio access network ("RAN") includes a transceiver for receiving a request from user equipment ("UE") to join the RAN. The RAN also includes a processor that is configured for: responding to the UE request by sending a message directly from the RAN to the UE to offer a set of first terms for the UE to use a cellular network of the RAN; receiving a response from the UE agreeing to the set of first terms; and in response to the UE agreeing to the set of first terms, connecting the UE to use a cellular network of the RAN.

19 Claims, 8 Drawing Sheets

ENABLING PERMISSIONLESS CELLULAR ROAMING CONNECTIONS BETWEEN USER EQUIPMENT AND RADIO ACCESS NETWORKS

BACKGROUND

Currently, cellular connections are only allowed between the user and a network of the user's carrier or another network that has a roaming agreement with the user's carrier. If the user travels to a certain location where there are no towers of the user's carrier available (referred herein as "roaming") and no roaming agreement in place on how the user's phone could connect to the other network's towers, then the user will have no service on his phone. This can be extremely frustrating for the user, especially given how important it is that a user is able to have connection on a user's phone.

Alternatively, if there are towers of carriers other than the user's carrier and there is a roaming agreement between these carriers, the user's carrier typically charge high rates for use of the carrier's network outside of the user's base coverage territory. This is also frustrating for the user to have to pay such high costs.

Thus, either the user will have no service at all or pay high roaming fees when traveling outside of his base coverage territory.

SUMMARY

Various embodiments provide systems and methods for allowing cellular connections while the cellular device is roaming. The cellular connections may be with carriers and networks other than those of the user's cellular carrier. In this regard, the user can negotiate and pay the upstream cell tower without a roaming deal in place with the user's carrier. This process could also be automatically and securely performed between the user's device (e.g. cell phone) and the roaming network.

According to an embodiment, disclosed is a radio access network ("RAN") that includes a transceiver for receiving a request from user equipment ("UE") to join the RAN, and a processor. The processor is configured for responding to the UE request by sending a message directly from the RAN to the UE to offer a set of first terms for the UE to use a cellular network of the RAN; receiving a response from the UE agreeing to the set of first terms; and in response to the UE agreeing to the set of first terms, connecting the UE to use a cellular network of the RAN.

According to another embodiment, a method is provided of user equipment ("UE") connecting to a radio access network ("RAN"). The method includes receiving, at the RAN, a request from user equipment ("UE") to join the RAN; responding, from the RAN, to the UE request by sending a message from the RAN directly to the UE to offer a set of first terms for the UE to use a cellular network of the RAN; receiving, directly from the UE, a response from the UE agreeing to the set of first terms; and in response to the UE agreeing to the set of first terms, connecting the UE to use a cellular network of the RAN.

According to another embodiment, a system includes a radio access network ("RAN") comprising a RAN transmitter and a RAN processor; and user equipment ("UE") comprising a UE transceiver configured to identify in response to the RAN being within range of the UE. The RAN processor is configured for: sending a message directly from the RAN to the UE to offer a set of first terms for the UE to use a cellular network of the RAN; receiving a response directly from the UE agreeing to the set of first terms; and in response to the UE agreeing to the set of first terms, connecting the UE to use a cellular network of the RAN.

BRIEF DESCRIPTION OF THE DRAWINGS

Aspects of the present invention are further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS

As mentioned above, various embodiments provide solutions to allow user equipment ("UE") to connect to a radio access network ("RAN"), especially where such RAN is part of a carrier that does not have a roaming agreement in place with the user's carrier.

Generally speaking, the UE will look up for any RANs available. When a RAN is located, the UE will request access and the UE will directly negotiate with the RAN for a rate that is mutually agreed upon between the RAN and the UE. If the rate is agreed upon, the RAN allows the UE to access the cellular network of the RAN, and the UE then pays the carrier of the RAN for such access based on the mutually agreed upon rate. This is all done directly and autonomously between the UE and the RAN (whereby the user's carrier is not involved in this process), according to some embodiments.

Figure 1A:
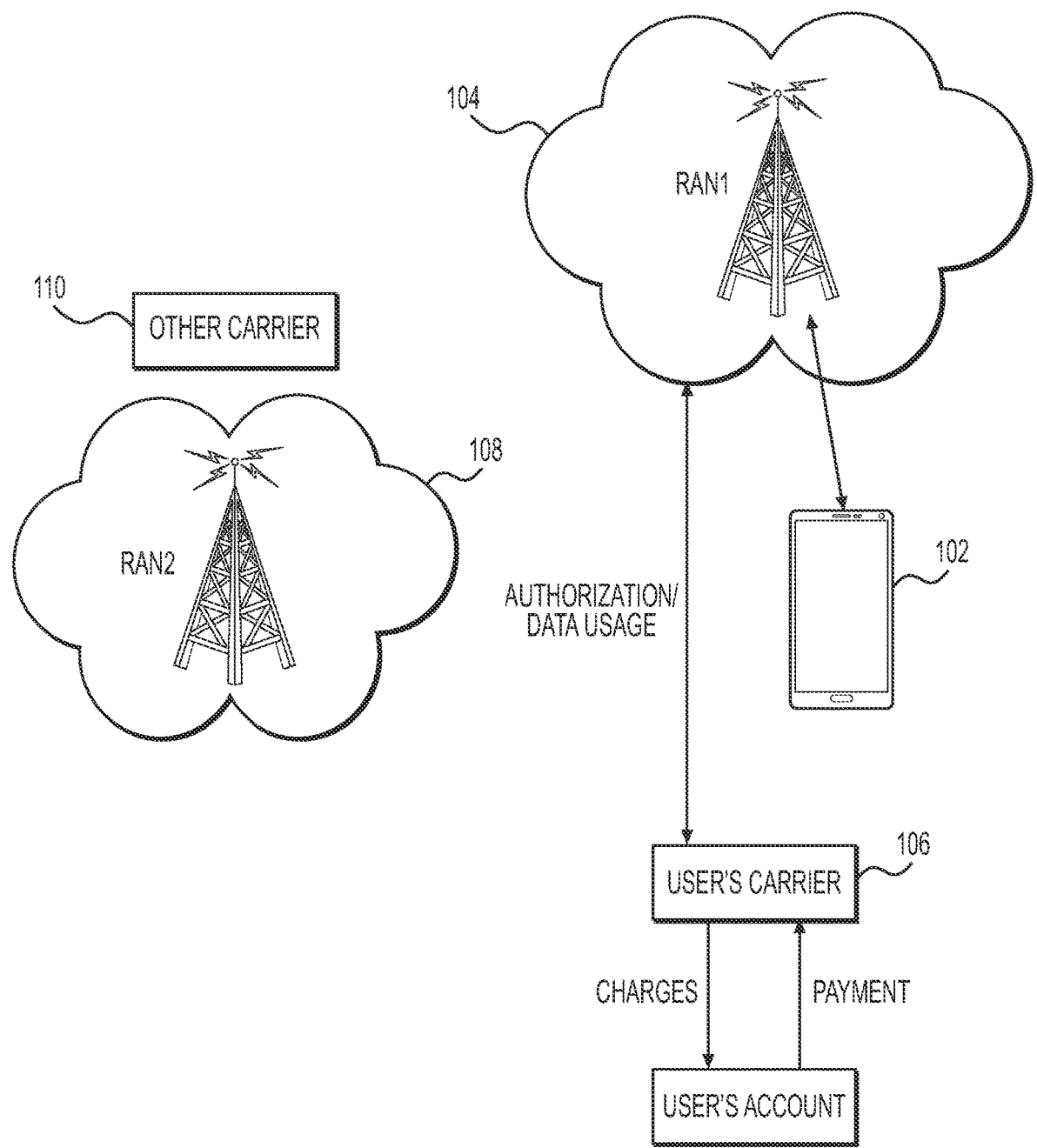
FIG. 1A illustrates a high level block diagram showing a user's device connecting to the user's carrier network.
Figure 1B:
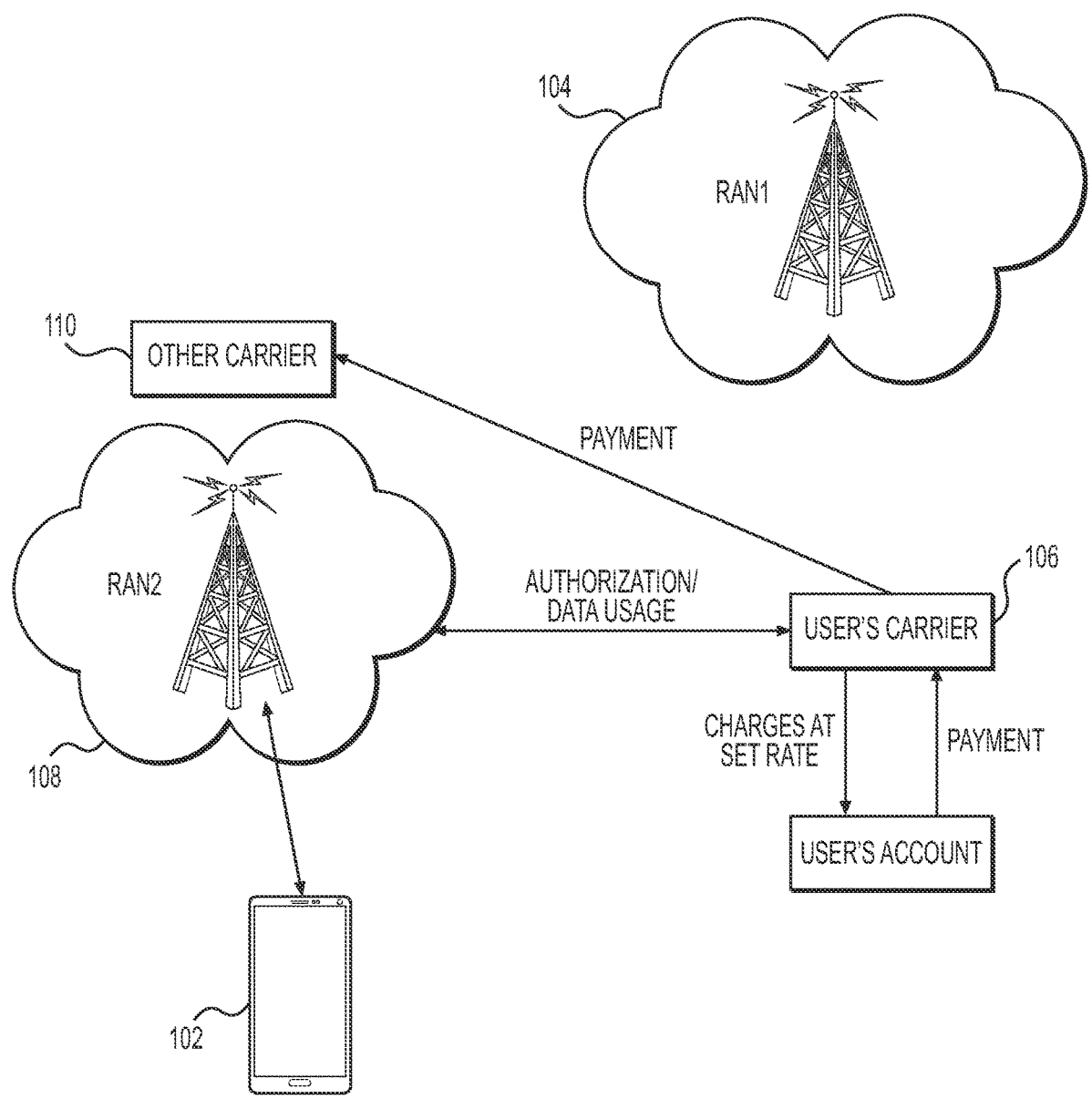
FIG. 1B illustrates a high level block diagram of components of a user's device connecting to a network other than the user's carrier where a roaming agreement is in place between the user's carrier and the other carrier.
Figure 1C:
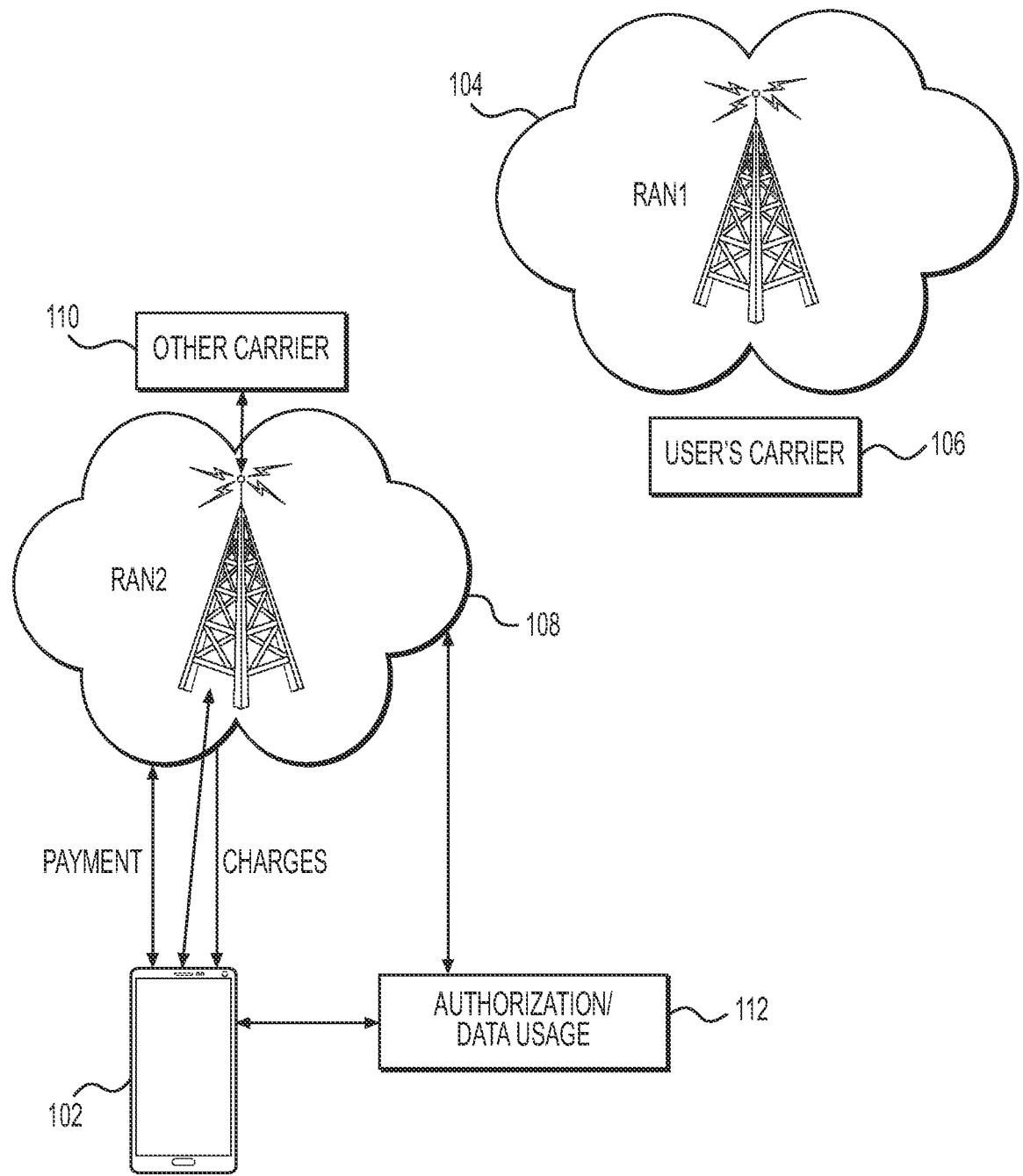
FIG. 1C illustrates a high level block diagram of components of a user's device connecting directly to a network other than the user's carrier according to some embodiments of the present invention.

FIGS. 1A and 1B illustrate a general overview of embodiments of the present application. FIG. 1A illustrates a high level block diagram showing a user's device connecting to the user's carrier network according to some embodiments, FIG. 1B illustrates a high level block diagram showing a user's device connecting to a network other than the user's carrier where a roaming agreement is in place between the user's carrier and the other carrier, and FIG. 1C illustrates a high level block diagram of components of a user's device directly connecting to such RANs other than those owned the user's carrier according to some embodiments.

Starting first in FIG. 1A, the UE 102 looks up and connects with a tower of a RAN 104 of the user's carrier (referred to herein as "RAN1"). RAN1 104 identifies that the UE 102 is a current customer of the user's carrier 106 based on subscriber data retrieved from the UE 102, and as such authorizes the UE 102 for a connection to RAN1 104 for using the cellular network (e.g., cellular calls, data usage, etc.).

To allow for such access, the user of the UE 102 is charged a recurring charge (e.g. a monthly fee) for use of networks (e.g., RAN1 104 and other RANs) of the user's carrier 106. The user's carrier 106 receives a payment from the user on the user's account, typically via an account associated with the user, such as the user's bank account or credit card.

However, once the user travels to a location that is outside of reach of RANs (e.g., out of reach of RAN1 104 and other RANs) of the user's carrier 106 (and thus is "roaming"), the UE 102 of the user can connect to RANs other than those owned by the user's carrier 106. For example, as shown in FIG. 1B, if the UE 102 is out of range of RAN1 104 of the user's carrier 106 and no other RANs of the user's carrier 106 are available, the UE 102 is "roaming" and, while "roaming", the UE 102 will attempt to look up other RANs in range of the UE 102.

If a roaming agreement is in place between the user's carrier 106 and the other carrier 110, the UE 102 connects to the RAN2 108 and the UE 102 is able to freely use the cellular towers to place phone calls and/or use data, as shown in FIG. 1B. However, this comes at a price to the user. Indeed, the roaming rate of using RAN2 108 is preset by the user's carrier 106 and such rates are typically expensive and are not negotiable. As such, when the user connects to RAN2 108 while the UE 102 is roaming, the user's charges can be quite high because the preset high rates set by the user's carrier 106.

As further illustrated in FIG. 1B, during/after using RAN2 108 while roaming, the user's carrier 106 charges the user's account the total amount of charges, and the user may then send payment to the user's carrier 106 for such roaming charges. A portion of the user's payment may be provided from the user's carrier 106 to the other carrier 110 per the roaming agreement between the carriers 106 and 108.

As one can ascertain from FIG. 1B, wireless roaming can be expensive but the user does not have much choice— either the user accepts high roaming charges or the user will not have any cellular connection to the UE 102.

The present application provides an alternative to the system of FIG. 1B in the exemplary embodiment of FIG. 1C, which illustrates a high level block diagram of the UE 102 connecting directly to RAN2 108 of the other carrier 110. In this regard, the UE 102 is configured to communicate directly with a tower in RAN2 110 regarding allowing access to RAN2 108 for UE 102. Such communication allows the UE 102 and RAN2 108 to come to agreement (e.g., via the UE 102 accepting RAN2's offer, via negotiation between RAN2 108 and the UE 102, etc.) on one or more connection terms (e.g., a connection rate, connection duration, connection data cap, etc.). If the terms are agreed to between the UE 102 and RAN2 108, RAN2 108 allows the UE 102 to use the cellular connections and data. Then, RAN2 108 sends charges directly to the UE 102, collects payment from the UE 102 on behalf of the other carrier 110 directly per the agreed upon terms.

In any event, as can be seen in FIG. 1C, the user's carrier 106 is not involved in the transaction (according to some embodiments) and the UE 102 negotiates a connection directly and autonomously with RAN2 108 (according to various embodiments).

FIG. 1C illustrates a general overview of exemplary embodiments, but more details on these and other embodiments are discussed in more depth below with regard to FIGS. 2-4.

Figure 2:
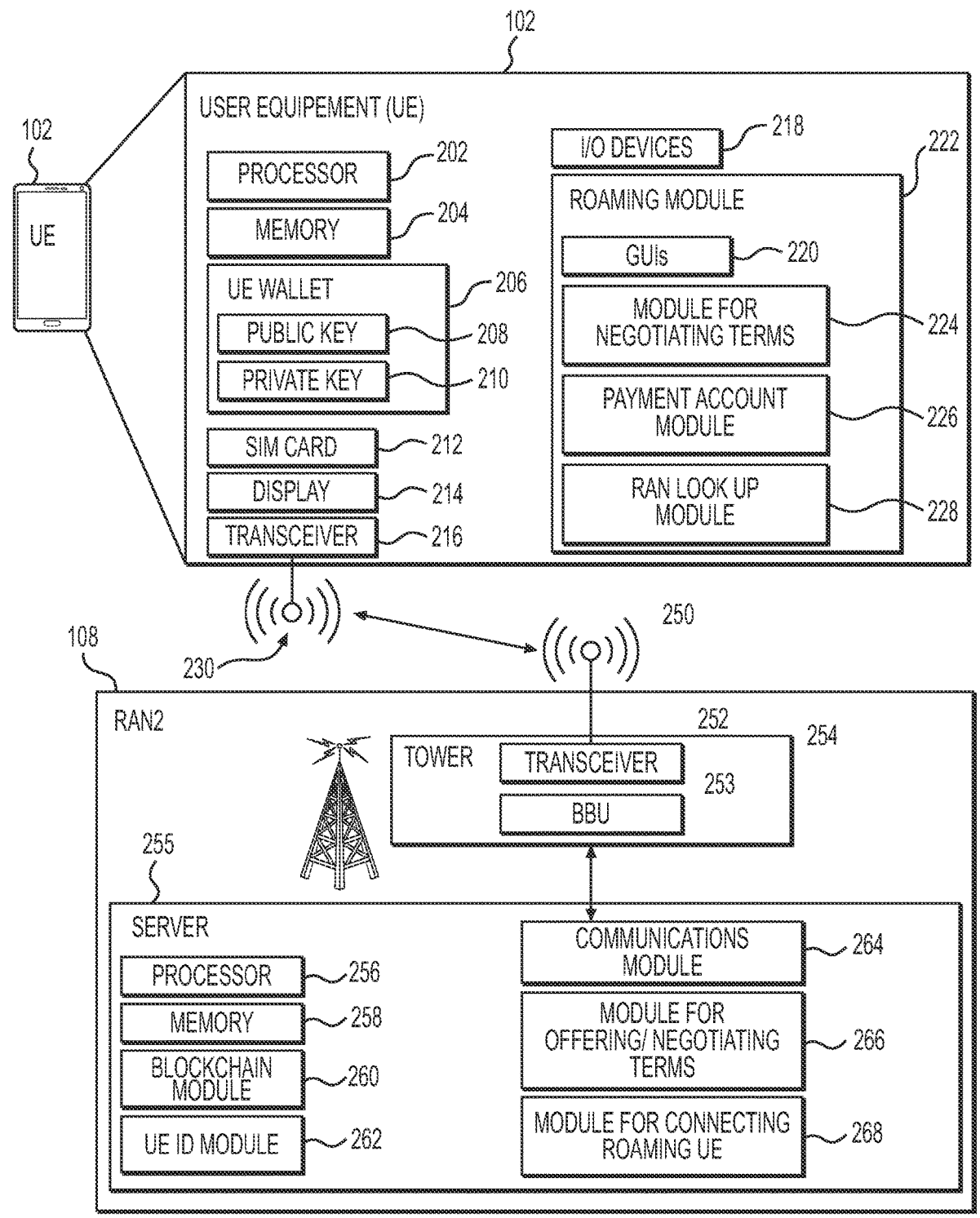
FIG. 2 illustrates a system of a user's device connecting to a network other than the user's carrier according to some embodiments of the present invention.

FIG. 2 illustrates a system of a user's device connecting to a network other than the user's carrier according to some embodiments. As shown, the UE 102 communicates directly with RAN2 108 in an effort for UE 102 to get on the cellular network of RAN2 108. Components of these systems 102 and 108 are shown in FIG. 2 and discussed below.

Starting first with the UE 102, the UE 102 may include a processor 202, memory 204, a UE wallet 206, a SIM (Subscriber Identity Module) card 212, a display 214, a transceiver 216, I/O devices 218, antenna 230 and a roaming module 222.

The processor 202 is configured to run instructions of software modules that may be stored in memory 204. The processor 202 also is configured to interact and communicate with any of the components of the UE 102. For example, the processor 202 is configured to process instructions so that transmissions of data are sent to transceiver 216 of the UE 102, which may then be transmitted out through antenna 230 of the UE 102. The processor 202 may be a hardware processor (e.g., "CPU", etc.) and may be configured to perform any of the steps discussed herein, such as those in the methods described in FIGS. 3A, 3B, and 4.

The memory 204 may be any computer readable storage medium, such as an electronic, magnetic, optical, electromagnetic, infrared, or semiconductor system, apparatus, or device, or any suitable combination of the foregoing. More specific examples (a non-exhaustive list) of the computer readable storage medium would include the following: a radio access memory (RAM), a read-only memory (ROM), an erasable programmable read-only memory (EPROM or Flash memory), an optical storage device, a magnetic storage device, or any suitable combination of the foregoing. In the context of this document, a computer readable storage medium may be any tangible medium that can contain, or store data for use by or in connection with an instruction execution system, apparatus, or device.

The UE wallet 206 may be a digital storage area on the UE 102 where a public key 208 and a private key 210 are stored. The public and private keys 208, 210 are the tools required to ensure the security of the blockchain, or the ledger of the transactions. When a user first powers on his UE 102, a unique pair of a public key 208 and a private key 210 is created. Each of the keys consists of a long string of alphanumeric characters that help to keep the RAN's transaction secure in the digital ecosystem.

When a transaction is initiated by a user to connect to a RAN (e.g., RAN2 108), the transaction has to be broadcast to the blockchain network where distributed nodes of the blockchain network confirm the validity of the transaction before finalizing it and recording it on the blockchain. Before the transaction is broadcast, however, it is digitally signed using the private key 210. The signature proves ownership of the private key 210, although it does not divulge the details of the private key 210 to anyone. Since a public key 208 is fashioned from the private key 210, the UE's public key 208 is used to prove that the digital signature came from his private key 210. Once the transaction has been verified as valid, the RAN connection between the RAN2 108 and the UE 102 is allowed to be completed.

The private key 210 is known to the user alone and serves as the user's digital ID. The private key 210 authorizes the user to carry out any transaction from his account. A sophisticated algorithm is applied to the private key 210 to generate the public key 208, and both keys are stored in the UE wallet 206.

The SIM card 212 is a small, portable memory chip that stores information about the UE 102. On it, there is a code that designates various information, such as the UE's country code of origin, the UE's carrier, and a unique user ID identifying the UE 102. The SIM card 212 can also carry other data, like a contact list and text messages. In this regard, if the user change phones, as long as the user keeps the SIM card 212, these contacts and text messages will transfer to the new UE. The SIM card 212 may be an eSIM card where data of the eSIM card is stored in memory 204 or the UE wallet 206. The eSIM card can have a payment account information stored on it which could be easily used to transfer payment directly to RAN2 108 in response to RAN2 108 applying charges to the UE 102 (as is discussed in more depth herein).

The display 214 may present data and applications to the user of the UE 102 as described herein. For example, any GUIs associated with the roaming module 222 may be presented on the display 214 and allow the user to input data to the UE 102.

The transceiver 216 of the UE 102 is configured to transmit and receive communications to and from the UE 102 via the antenna 230. When the transceiver 216 receives data, for example, from the antenna 230, the transceiver 216 transfers such data to the processor 202 for appropriate processing. Also, when the transceiver 216 receives instructions to transmit data from the UE 102, the transceiver 216 sends broadcast signals from the transceiver 216 to the antenna 230 which then broadcasts such data over the air for reception by any other device (e.g., RAN2 108) via a corresponding antenna (e.g., antenna 250).

The UE 102 may also include one or more input devices, output devices or combination input and output device, collectively I/O devices 218. The I/O devices 218 may include a touch screen or a keyboard to control operation of applications and interaction features described herein. The I/O devices 218 may also include devices for reading computer media including computer-readable or computer-operable instructions stored on portable medium, such as the SIM card 212.

The UE 102 may also include software modules, such as a roaming module 222 for connecting to RAN2 108 that is operable on the UE 102 of a user. The methods discussed herein may be embodied in or performed by the roaming module 222. For example, the method of FIGS. 3A-3B (collectively "FIG. 3") may be performed by the roaming module 222.

The roaming module 222 may be stored on the memory 204 of the UE 102, and the roaming module 222 may be accessed from the memory 204 and run on the processor 202 associated with the UE 102.

The roaming module 222 may include various sub-modules. For example, the roaming module 222 may include a module for negotiating terms 224. The module for negotiating terms 224 allows the UE 102 to autonomously interact and directly communicate with the RAN2 108 to directly negotiate terms with the RAN2 108, as will be discussed in more detail below with regard to FIG. 3.

The roaming module 222 may also include a payment account module 226. The payment account module 226 allows for a user to initiate payment from the UE 102 to RAN2 108 using an account of the UE 102, such as an eSIM card, a bank account of the user, and any other systems where the UE 102 can direct payment to the RAN2 108.

The roaming module 222 may also include a RAN look up module 228. The RAN look up module 228 is configured to search for RANs in a geographic range around the current location of the UE 102. This is accomplished by sending a beacon signal from the antenna 230, where the beacon signal contains a message with a request for a response. Upon receipt by a RAN, such RAN will reply back with a reply message indicating that the RAN is located within the range of the UE 102. The RAN look up module 228 will return such reply message to the processor 202 for appropriate processing with other modules of the roaming module 222.

The roaming module 222 may further include GUIs 220. The roaming module 222 may present one or more predetermined GUIs 220 to permit the user to define preferences and/or any other information and/or settings, such as predetermined negotiation settings so that the UE 102 can automatically accept terms that are within the predetermined thresholds. For example, if the user sets a predetermined threshold via a GUI 220 that a rate of $X/day or $X/data amount is acceptable and a RAN offers a rate of $Y/day or $Y/data amount, then the UE 102 can automatically accept such offer as long as the $Y is less than or equal to $X, but will renegotiate the rate if $Y is greater than $X.

In any event, the GUIs 220 may be predetermined and/or presented in response to the user indicating the user would like to enter information and/or settings. The predetermined GUIs 220 may be generated by the roaming module 222 and may be presented on the display 214 of the UE 102.

The above description describes some embodiments of the UE 102 but is not limited to these embodiments and may include one or more additional features not explicitly described above.

As previously mentioned, the UE 102 communicates with a RAN, which is illustrated as being RAN2 108 for ease of description herein. However, the RAN may be any RAN and should not be limited to the embodiments explicitly shown in FIG. 2. A discussion of RAN2 108 will now be provided.

RAN2 108 may be a component of a wireless telecommunications system that connects individual devices to other parts of a network through a radio link. RAN2 108 links user equipment, such as a cellphone, computer or any remotely controlled machine, over a fiber or wireless backhaul connection. That link goes to the core network, which manages subscriber information, location and more, as described in more depth below.

RAN2 108 is the radio element of the cellular network. A cellular network is made up of land areas called cells. A cell is served by at least one radio transceiver, although the standard is typically three for cell sites.

The capabilities of RAN2 108 include voice calls, text messaging, and video and audio streaming. The types of user equipment using these networks include cell phones, vehicles, drones and internet of things devices.

The components of RAN2 108 include base stations and antennas that cover a specific region, depending on their capacity. Silicon chips in both the core network and the user equipment provide RAN functionality. RAN2 108 is made up of three elements: (1) antennas 250 that convert electrical signals into radio waves, (2) radio transceivers 252 that receive and transform digital information into signals that can be sent wirelessly and ensure that transmissions are in the correct frequency bands with the right power levels, and (3) baseband units (BBUs) 253 provide a set of signal processing functions that make wireless communication possible. Traditional baseband uses custom electronics combined with multiple lines of code to enable wireless communication, typically using the licensed radio spectrum. BBU processing detects errors, secures the wireless signal and ensures that wireless resources are used effectively.

As illustrated in FIG. 2, RAN2 108 is shown with a tower 254, which includes a radio transceiver 252 and a BBU 253. The radio transceiver 252 receives transmissions via antenna 250, such as beacon messages from UE 102, and transfers those messages to BBU 253 for processing.

Moreover, RAN2 108 is also shown as communicating with a server 255 which has processor 256, memory 258, and various modules 260-268 for executing functions of the methods discussed herein.

It should be understood that the components of the server 255 may be implemented in the tower 254 so that there need not be a device that is separate from the tower 254. As such, the present invention should not be limited to the specific embodiments illustrated in FIG. 2.

The processor 256 of the server 255 is configured to run instructions of software modules that may be stored in memory 258. The server processor 256 also is configured to interact and communicate with any of the components of the server 255 and/or the RAN tower 254. For example, the processor 256 is configured to process instructions so that transmissions of data are sent to the transceiver 252 of the RAN2 108, which may then be transmitted out through antenna 250. The processor 256 may be a hardware processor and may be configured to perform any of the steps discussed herein, such as those in the methods described in FIGS. 3 and 4.

The memory 258 may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a radio access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The server 255 may include a series of modules in order to allow a UE 102 to securely connect to and use the cellular network of RAN2 108. These modules may include a communications module 264, a UE ID module 262, a module for offering/negotiating terms 266, a module for connecting a roaming UE 268, and a blockchain module 260.

The communications module 264 is configured to control communications between the RAN2 108 and the UE 102. This includes controlling communications being sent out via the transceiver 252 (and antenna 250) as well as communicating data and instructions between the various modules and the processor 256 and memory 258. The communications module 264 also receives data received through the transceiver 252 and determines the appropriate deliver location for such data. For example, when the communications module 264 receives UE ID information (SIM card data, ICCID/IMSI data, location data, etc.), such UE ID data is then transmitted to the UE ID module 262. The UE ID module 262 is configured to receive and process the UE ID data to determine various information about the UE 102, including the location of the UE 102, the subscription information of the UE 102, and other identifying information of the UE 102. This information may be used to determine if the UE 102 is an "out of network" device, is provisioned, etc., according to some embodiments The module for offering/negotiating terms ("offering/negotiating module") 266 is configured to autonomously negotiate terms with a roaming UE trying to use the cellular network of the RAN2 108. These terms may relate to the connection rate, data usage rate, total data usage amount/cap, time duration, connection speeds, and any other terms which are related to using a cellular network for a UE 102. The offering/negotiating module 266 is configured to initially make an offer based on a preset rate or a current market rate. In one embodiment, the offering/negotiating module 266 coordinates with the communications module 264 to make the initial offer and negotiate with the UE 102.

Also, the offering/negotiating module 266 is configured to receive and process offers (e.g., initial offers, counter offers, etc.) for connecting to the RAN2 108 directly from the UE 102. For example, the offering/negotiating module 266 may receive a counter offer and determines if a counter offer from the UE 102 is acceptable or not based on predetermined thresholds which are based parameters such as current RAN2 capacity, current speeds for connected UEs, preset rates that the RAN2 108 does not want to go below, etc. The offering/negotiating module 266 also determines when the RAN will stop the negotiation process based on whether the negotiations are successful or not, how many counter offers will be allowed to be received, whether the current rates are even negotiable, whether capacity of the RAN2 108 has changed, etc.

The offering/negotiating module 266 also is configured to accept terms and determine when the terms are accepted. When such acceptance occurs, the offering/negotiating module 266 sends a signal to the module for connecting a roaming UE 268 indicating that the UE is authorized for using the RAN2's cellular network.

The module for connecting a roaming UE 268 connects the UE 102 to the RAN2 in response to receiving the authorization signal from the offering/negotiating module 266 indicating that the terms being accepted by the RAN2 108. The module for connecting a roaming UE 268 is configured to provide the UE 102 with an IP address on the network of the RAN2 108 where such IP address is limited to only give access per the terms that were accepted with the UE 102. In this regard, when the terms are completed by the UE 102, then the module for connecting a roaming UE 268 will end the connection to the RAN2 network for the UE 102. For example, when the UE 102 has exceeded the data limit, the module for connecting a roaming UE 268 would disconnect the UE 102 from the network (and may forward the UE 102 back to the negotiating/offering module 266 to further receive and accept additional or new terms).

The server also includes a blockchain module 260, which is configured to ensure the transactions are valid and secure, as will be discussed in more depth with regard to FIG. 4. Generally, the blockchain module 260 is configured to validate the blockchain and sign the blockchain when the terms are accepted. The blockchain module 260 also may store the blockchain in memory 258.

It should be understood that the above description is some embodiments of the RAN2 and the server 255 and the RAN2 and the server 255 should not be limited to the features described herein and may include additional and/or other features.

Figure 3A:
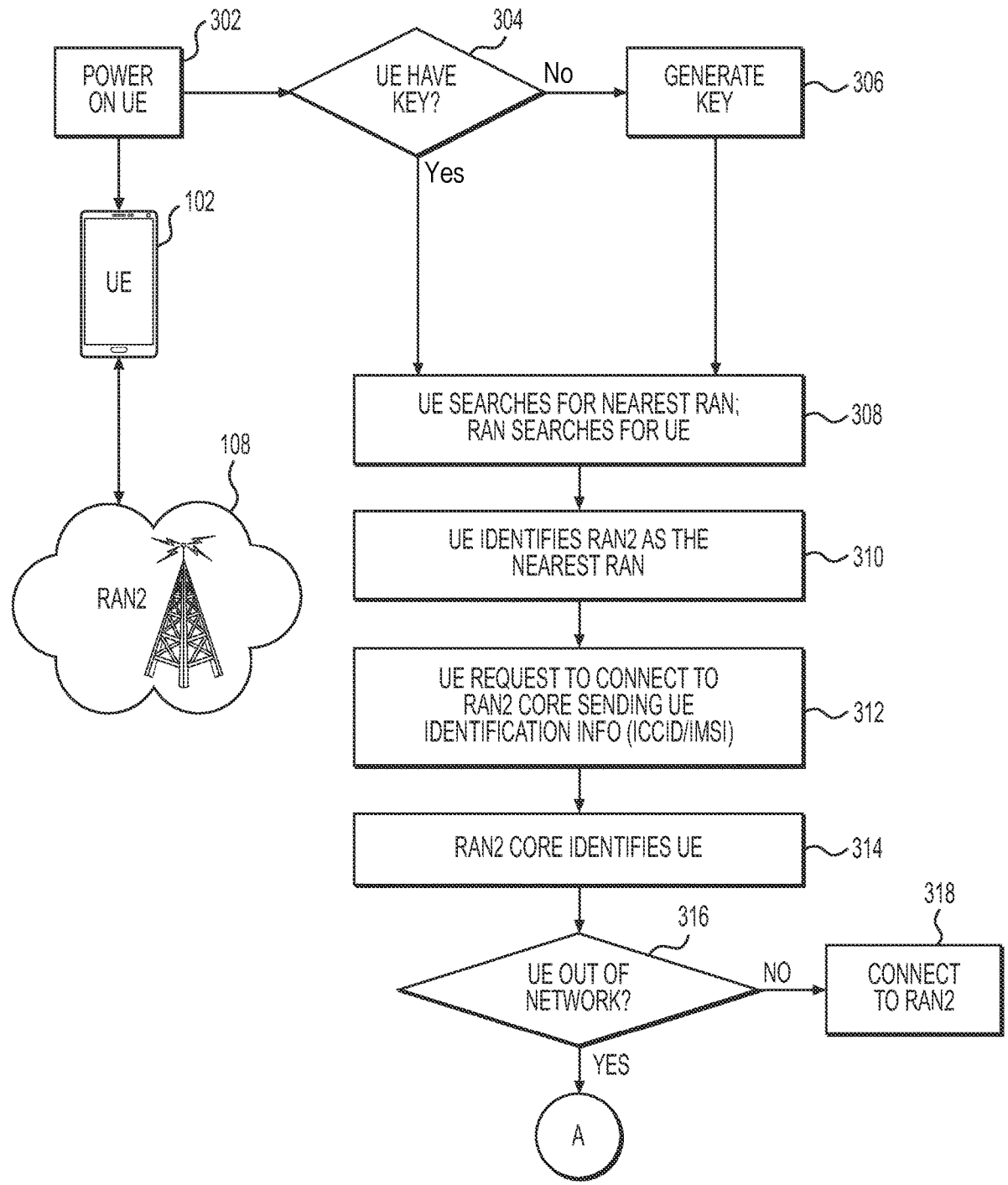
FIG. 3 illustrates a method of a user's device connecting to a network other than the user's carrier according to some embodiments of the present invention.
Figure 3B:
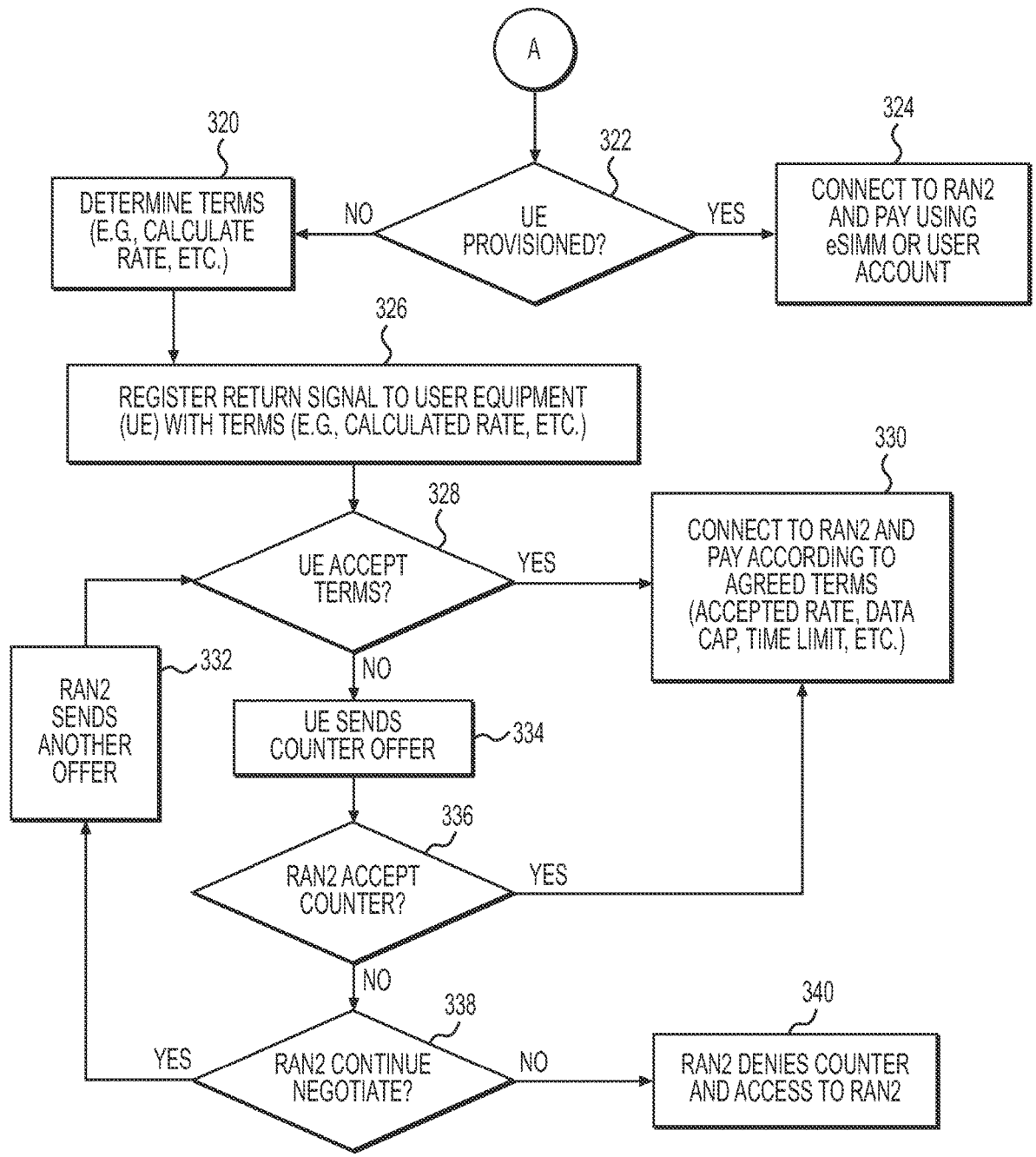

FIGS. 3A and 3B (collectively FIG. 3) illustrate a method of a user's device connecting to a network other than the user's carrier according to some embodiments.

In block 302, the UE 102 is powered on. When the UE 102 is powered on, the UE 102 determines if the UE has a key in its wallet, as provided in block 304. If there is no key present, the UE 102 generates a key in block 306. The keys include a public key 208 and a private key 210, similar to keys used in non-fungible transactions. As explained above, these keys 208, 210 are used to receive and make transactions on a ledger. The public key 208 is a key used to sign a blockchain and is accessible for all to verify the identity of the UE 102, while the private key 210 is used in order to sign the blockchain and to identify the UE's identity to the system.

After the keys 208, 210 are generated in block 306 or after determining that the keys 208, 210 already exist in block 304, the UE 102 sends out a beacon to "look up" close RANs or determine which RANs are in range of the UE 102. Additionally, RAN2 108 sends out beacons to "look up" or search for UEs within range. Any UE within range of RAN2 108 will send a signal back identifying the UE 102 to the RAN2 108 and the RAN2 108 will send a response to any UE beacon signal received.

In block 310, the UE 102 determines that RAN2 108 is the nearest RAN available. This is determined by the UE 102 determining the signal strength of RAN2 108 relative to signals received from other RANs is the highest.

In block 312, the UE 102 requests to connect to the RAN2 108. This is done by sending the UE's identification information, such as the SIM card data or other ID data, such as ICCID/IMSI data of the UE 102, etc.

The IMSI is the International Mobile Subscriber Identity, which is a unique identifier that defines a subscriber in the wireless world, including the country and mobile network to which the subscriber belongs. The IMSI has the format MCC-MNC-MSIN. MCC=Mobile Country Code (e.g. 310 for USA); MNC=Mobile Network Code (e.g. 410 for AT&T), MSIN=sequential serial number. All signaling and messaging in GSM and UMTS networks uses the IMSI as the primary identifier of a subscriber. The IMSI is one of the pieces of information stored on a SIM card.

The ICCID is the Integrated Circuit Card ID, which is the identifier of the actual SIM card itself—i.e. an identifier for the SIM chip. It is possible to change the information contained on a SIM (including the IMSI), but the identity of the SIM itself remains the same.

In any event, this identifying information is sent to the core network (UDM/HSS/HLR) which will then identify the UE 102, subscriber information, etc. For example, Home Location Register (HLR)/Home Subscriber Server (HSS) relates to a database containing subscriber information in the 3GPP network, and the HSS may perform functions such as configuration storage, identity management, and user state storage. Unified data management (UDM) manages network user data in a single, centralized element. The technology is similar to the 4G network's home subscriber service (HSS) but is cloud-native and designed for 5G. It can be paired with the user data repository (UDR) which stores the user data such as customer profile information, customer authentication information, and encryption keys for the information. UDM utilizes microservices to communicate between the user and the core controller.

Using these devices in the core network will identify the subscription services of the UE 102 to determine which carrier network the UE 102 is subscribed to as well as the UE 102 identification information. As such, in block 314, the RAN2 108 identifies the UE 102 and the network subscriber information.

In decision block 316, RAN2 108 determines whether the UE 102 is out of network or not. This is done by comparing the network carrier of RAN2 108 with the subscriber information of the UE 102. If they match, the RAN2 core network determines that the UE 102 is "in network" and the UE 102 is connected to the RAN2 108 as a network that is part of the UE 102 subscription, as provided in block 318.

However, if the UE subscriber information does not show the UE 102 is part of the carrier that operates RAN2 108, the system determines the UE 102 is "out of network" and proceeds to decision block 322 in FIG. 3B.

In FIG. 3B, the method determines whether the UE is provisioned or not. In order to provide the services through a 5G network system, the UE's carrier provider may have to provision service-related pre-configuration information to UEs. To this end, the 5G system may provide a method by which the service providers can perform service-related pre-configuration information provisioning to UEs, which is referred to herein as provisioning.

In this regard, if the UE 102 is determined to be provisioned, then the roaming rate for connecting the UE 102 is predetermined and the UE 102 connects to RAN2 108 and pays the terms as has been predetermined, under block 324.

If the UE 102 is not provisioned, the method proceeds to block 320 where the UE 102 is provisioned to connect to RAN2 108. One of such provisioning includes determining the terms of the UE 102 connecting and using RAN2 108. For example, the RAN2 108 may calculate the terms of connecting, including the roaming rate that will be charged to the user for use of RAN2 108. This may be a preset roaming rate ($X/hour, $X/day, $X/data amount, etc.) or may be a variable roaming rate based on a current market rate (which may fluctuate based on how many UEs are current connected, the current data usage, the capacity of the RAN, etc.).

In block 326, a return signal is registered from RAN2 108 to the UE 102 with the terms determined in block 320. These terms may be received by the UE 102 and may be displayed to the user via a GUI on a display of the UE 102. The user would then have opportunity to manually accept or decline the terms or the UE 102 may automatically accept terms that fall below a predetermined thresholds preset by the user.

If the terms are accepted, the method continues to block 330 where the UE 102 connects to RAN2 108 and pays according to the accepted terms. In this regard, the UE 102 uses the cellular towers of RAN2 108 and the amount of usage may be used in calculating charges for the user. Regardless, the charges for the user are then determined and charged to the user.

If the terms are not accepted, the UE 102 can provide a counter offer to the RAN2 108 based on terms that are preset by the user as acceptable to the user. For example, the counter offer for the UE 102 may be automatically determined by the UE based on preset thresholds set by the user. If the rate offered by the RAN2 102 falls within certain conditions then the UE 102 will automatically counter offer a predetermined rate. For example, if the RAN2 102 offers a rate of $10/1 GB of data and the UE user has preset that the most he will pay is $5/GB of data, the UE may counter offer the threshold amount of $5/GB or a percentage lower than the maximum threshold for negotiation purposes, such as $4/GB. Regardless, various thresholds can be preset by the user, including roaming rates, data usage rates, total data usage amount/caps, time durations, connection speeds, and any other terms which are related to using a cellular network for a UE 102. When the offer by the RAN2 falls below these thresholds, the UE 102 may automatically accept the terms. However, if one of the terms does not fall within a preset threshold, the UE 102 may decline and send a counter offer that is within the preset thresholds. In this regard, the counter offer can be automatically sent by the UE 102 so that the user is not involved in the negotiation process while it is occurring.

The RAN2 108 receives such counter offer and the RAN2 108 must determine if such offer is acceptable in decision block 336. If so, the method may proceed to block 330; otherwise, the method may continue to decision block 336 where it is determined whether RAN2 108 wants to continue to negotiate.

In block 336, if the RAN2 108 does not want to negotiate further, RAN2 108 then declines the counter offer and denies the UE 102 access to RAN2 108; otherwise, RAN2 108 may send another offer back to the UE 102 and the method may then return to block 328.

Figure 4:
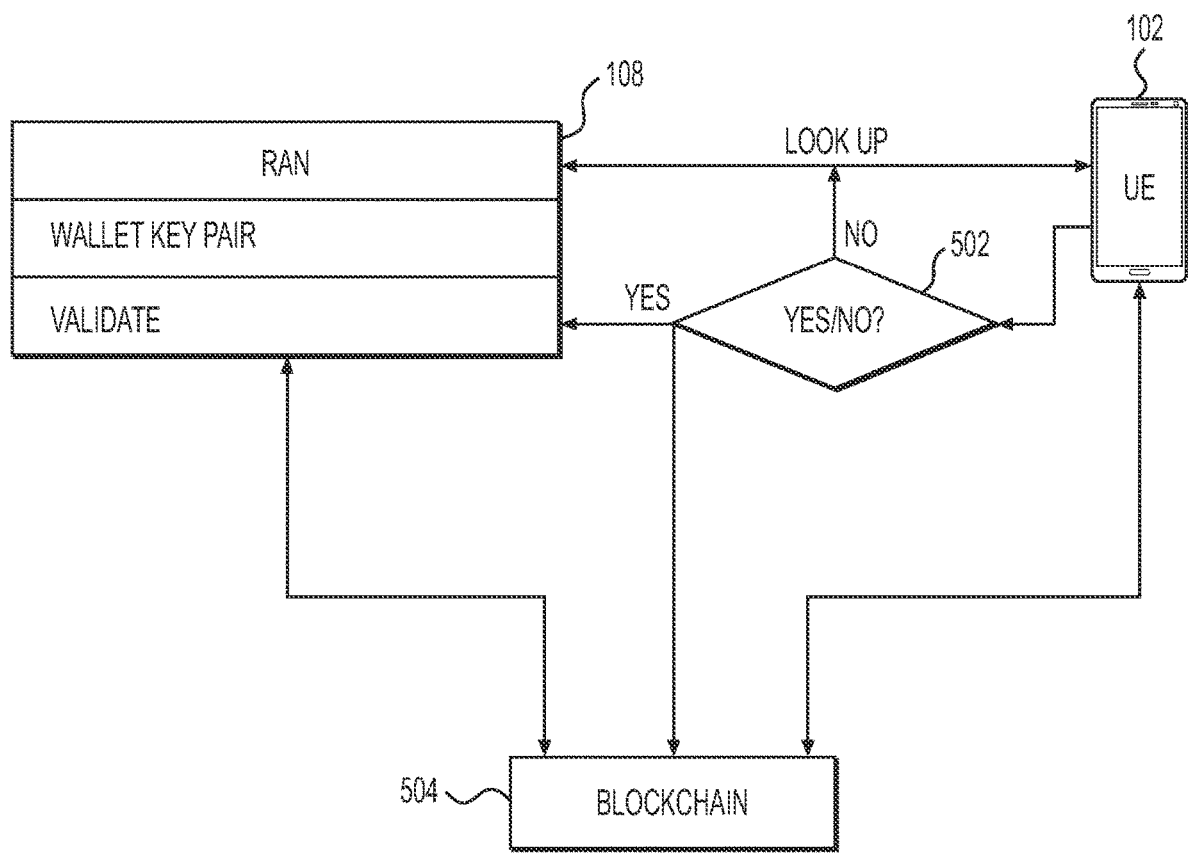
FIG. 4 illustrates a method of validating a user's device via a blockchain and signing a blockchain when access is provided for the UE to the RAN according to some embodiments of the present invention.

FIG. 4 illustrates a method of validating a user's device via a blockchain and signing a blockchain when access is provided according to some embodiments. As mentioned above in block 308, the RAN2 108 and UE 102 each perform a search or "look up" to determine nearby UEs and RANs, respectively. If they find each other in block 502, then the UE 102 is validated using the keys 208, 210 stored on the UE 102 via a blockchain 504.

The validation is a process used in blockchain technology to determine if the blockchain is correct using other blockchains published and public keys.

Once the blockchain is validated, it is signed by the UE 102 and the RAN2 108 using the public and private keys of the UE 102, as described above. The blockchain can then be published for others to validate and will be available for the next transaction.

Figure 5:
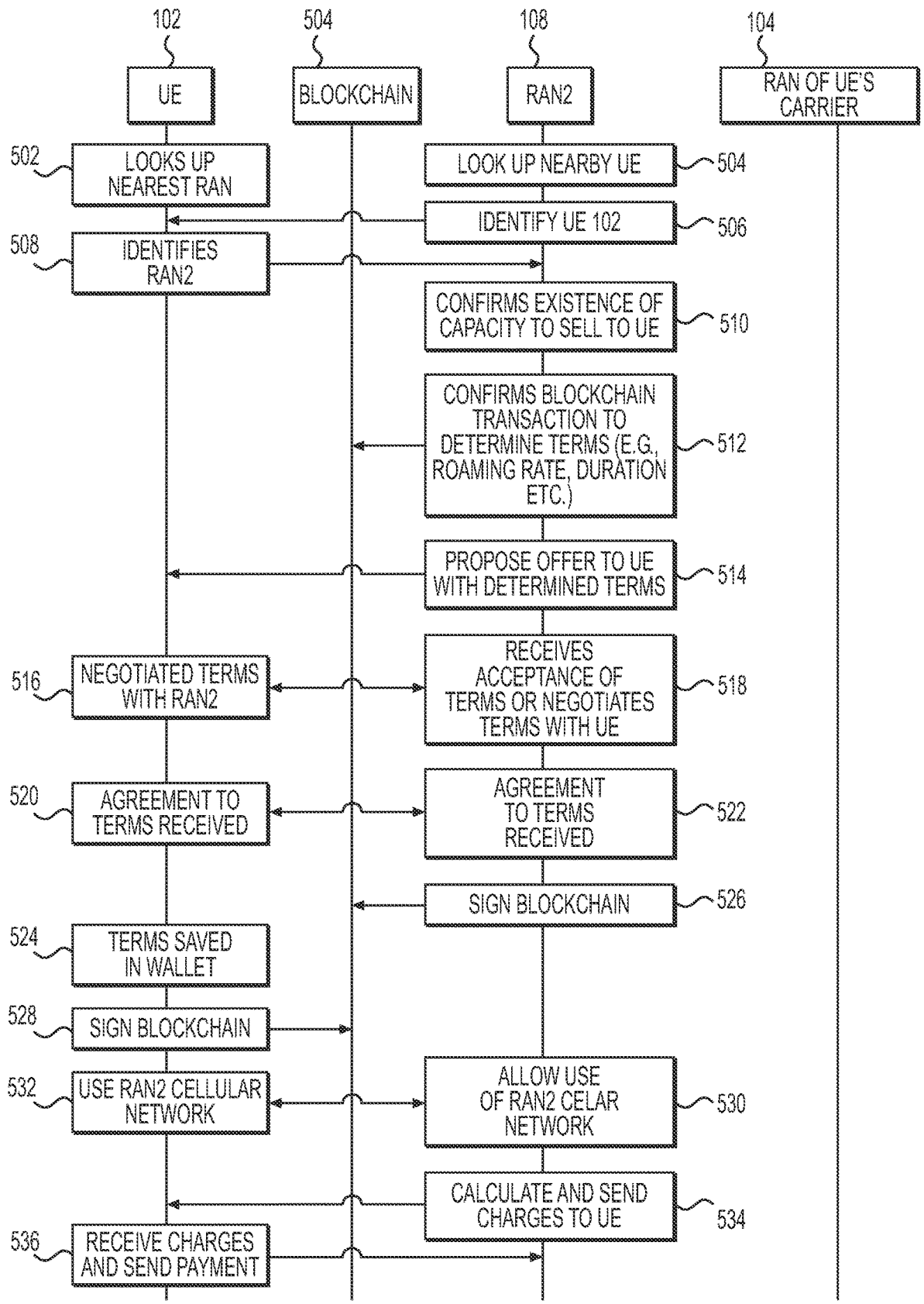
FIG. 5 illustrates a block diagram of a method of a user's device connecting to a network other than the user's carrier and utilizing a blockchain according to some embodiments of the present invention.

FIG. 5 illustrates a block diagram of a method of a user's device connecting to a network other than the user's carrier and utilizing a blockchain according to some embodiments of the present invention.

As shown in FIG. 5, the UE 102, RAN2 108 and RAN1 104 (i.e., RAN of UE's carrier with which the UE has a subscription) are shown in columns and under such columns are actions for each of these entities.

In blocks 502 and 504, the UE 102 looks up for nearby RANs to potentially connect to, and the RAN2 108 looks up for nearby UEs. In block 506, RAN2 108 identifies UE 102 and/or UE 102 identifies RAN2 108 in block 508.

At this point, RAN2 108 identifies that UE 102 will likely request for bandwidth on the network of RAN2 108. As such, in block 510, RAN2 108 will check to see if there is extra capacity for RAN2 108 (or if determine RAN2 108 even wants to offer any capacity to UE 102). If so, RAN2 108 then confirms the blockchain transaction to determine terms (e.g., a roaming rate, etc.) that would be acceptable for RAN2 108 to allow UE 102 to connect to and use the network of RAN2 108 as provided in block 512.

Then, in block 514, RAN2 108 proposes an offer to the UE 102 with the determined terms, including the calculated roaming rate, as previously discussed. This is done by sending a message with such information to the UE 102. The UE 102 then receives such offer and will either autonomously negotiate the terms (block 516) or agree to the terms (block 520). If the UE 102 negotiates with RAN2 108, RAN2 108 may receive counter offers and also autonomously negotiate back with the UE (block 518) as described herein.

Once all terms are agreed upon, a message is sent between the UE 102 and RAN2 108 indicating agreement to terms, in blocks 520 and 522. In response thereto, the UE 102 saves the terms (e.g., roaming rate) in the UE's wallet (block 528) and both the UE 102 RAN2 108 sign the blockchain.

At this point, the RAN2 108 lets the UE 102 use the cellular network of RAN2 108, and the UE 102 then uses such cellular network but making cellular calls, text messages, internet streaming, or any other use of cellular towers for the UE 102, as provided in blocks 530 and 532.

During and/or after the use by the UE 102 of the network of RAN2 108 is completed, RAN2 108 then calculates the charges of the UE 102 based on the data used, time used, roaming rate, data limits, and/or any other agreed up terms and sends such calculated charges directly to the UE 102. In response to the UE 102 receiving such charges, the UE 102 then automatically sends payment directly to RAN2 108 or another entity associated with RAN2 108 (e.g., the carrier of RAN2 108).

As illustrated in FIG. 5, RAN1 104 is not involved in the transaction between the UE 102 and RAN2 108 and the method may be completely autonomous without any user input, in some embodiments. However, it should be noted that the user may be able to provide input or assist in the negotiation process with RAN2 108, in some embodiments.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A radio access network ("RAN") comprising:
    a transceiver configured for communicating with user equipment ("UE"); and
    a processor configured for:
        receiving a request from a UE to access the RAN;
        determining a current rate for the UE to use a cellular network of the RAN based on the request;
        automatically negotiating an agreement between the UE and the RAN, including:
            sending a message directly from the RAN to the UE with a set of first terms that includes the current rate for the UE to use the cellular network of the RAN; and
            receiving a response directly from the UE that accepts the set of first terms or that includes a second term that is different from at least one term in the set of first terms; and
        in response to the UE accepting to the set of first terms or the RAN accepting the second term, authorizing the UE to use the cellular network of the RAN.

2. The radio access network of claim 1, wherein the UE automatically accepts the set of first terms offered by the RAN without input from a user of the UE.

3. The radio access network of claim 1, wherein the processor is further configured for:
    in response to receiving the response that includes the second term, autonomously accepting the second term.

4. The radio access network of claim 1, wherein the processor is further configured for:
    declining the second term.

5. The radio access network of claim 1, wherein the receiving the response from the UE that accepts the set of first terms is performed autonomously in response to receiving the offer message with the set of first terms so the acceptance is performed without input from a user of the UE.

6. The radio access network of claim 1, wherein the processor is further configured for:
    determining whether the UE is a subscriber to a carrier of the RAN.

7. The radio access network of claim 1, wherein the UE comprises one of a cellular phone, a tablet, a vehicle, or a computer.

8. The radio access network of claim 1, wherein the processor is further configured for:
    validating the UE and validating a transaction between the UE and the RAN; and
    signing a ledger of a blockchain.

9. A method of user equipment ("UE") connecting to a radio access network ("RAN"), the method comprising:
    receiving, at the RAN, a request from user equipment ("UE") to join the RAN, the request comprising information identifying the UE;
    determining a current rate for the UE to use a cellular network of the RAN based on the request;
    automatically negotiating an agreement between the UE and the RAN, including:
        responding, from the RAN, to the UE request by sending a message from the RAN directly to the UE with a set of first terms that includes the current rate for the UE to use a the cellular network of the RAN; and
        receiving, directly from the UE, a response from the UE that accepts the set of first terms; and
    in response to the UE accepting the set of first terms, authorizing the UE to use the cellular network of the RAN.

10. The method of claim 9, wherein the UE automatically accepts the set of first terms offered by the RAN without input from a user of the UE.

11. The method of claim 9, further comprising:
    receiving a counter offer response from the UE with second terms that different from the set of first terms; and
    in response to receiving the counter offer response that includes the second terms, automatically accepting the second terms.

12. The method of claim 9, further comprising:
    receiving a counter offer response from the UE with second terms that different from the set of first terms; and
    declining the second terms.

13. The method of claim 9, wherein the receiving the response from the UE that accepts the set of first terms is performed autonomously in response to receiving the message with the set of first terms so the acceptance is performed without input from a user of the UE.

14. The method of claim 9, further comprising:
    determining whether the UE is a subscriber to a carrier of the RAN.

15. A system comprising:
    a radio access network ("RAN") comprising a RAN transmitter and a RAN processor; and user equipment ("UE") comprising a UE transceiver configured to identify in response to the RAN being within range of the UE, wherein the RAN processor is configured for:
  receiving a request from a UE to access the RAN;
  determining a current rate for the UE to use a cellular network of the RAN based on the request;
  automatically negotiating an agreement between the UE and the RAN, including:
    sending a message directly from the RAN to the UE with a set of first terms that includes the current rate for the UE to use the cellular network of the RAN;
    receiving a response directly from the UE that includes a second term that is different from at least one term in the set of first terms; and
  in response to the RAN accepting the second term, authorizing the UE to use the cellular network of the RAN.

16. The system of claim 15, wherein the UE automatically accepts at least a portion of the set of first terms offered by the RAN without input from a user of the UE.

17. The system of claim 15, wherein the RAN processor is further configured for:
  in response to receiving the response that includes the second term, automatically accepting the second term.

18. The system of claim 15, wherein the RAN processor is further configured for:
  declining the second term.

19. The system of claim 15, wherein the RAN processor is further configured for:
  validating the UE and a transaction between the UE and the RAN; and
  the UE and the RAN signing a ledger of a blockchain.

* * * * *

UNITED STATES PATENT AND TRADEMARK OFFICE
CERTIFICATE OF CORRECTION

| | | |
|---|---|---|
| PATENT NO. | : 12,177,725 B2 | Page 1 of 1 |
| APPLICATION NO. | : 17/710343 | |
| DATED | : December 24, 2024 | |
| INVENTOR(S) | : Jennings Orcutt | |

It is certified that error appears in the above-identified patent and that said Letters Patent is hereby corrected as shown below:

In the Claims

Column 13, Claim 1, Line 58:
"accepting to the set" should read: --accepting the set--.

Column 14, Claim 5, Line 7:
"the offer message" should read: --the message--.

Column 14, Claim 9, Line 35:
"to use a the" should read: --to use the--.

Signed and Sealed this
Fourth Day of March, 2025

Coke Morgan Stewart
*Acting Director of the United States Patent and Trademark Office*